United States Patent
Pattok et al.

(10) Patent No.: US 10,411,544 B2
(45) Date of Patent: Sep. 10, 2019

(54) BRUSHLESS MOTOR ASSEMBLY

(71) Applicant: Steering Solutions IP Holding Corporation, Saginaw, MI (US)

(72) Inventors: Eric D. Pattok, Frankenmuth, MI (US); Caleb S. Palmer, Freeland, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 377 days.

(21) Appl. No.: 15/283,761

(22) Filed: Oct. 3, 2016

(65) Prior Publication Data

US 2018/0097420 A1 Apr. 5, 2018

(51) Int. Cl.
| | |
|---|---|
| *H02K 5/22* | (2006.01) |
| *H02K 5/04* | (2006.01) |
| *H02K 11/21* | (2016.01) |
| *H02K 29/08* | (2006.01) |
| *H02K 29/10* | (2006.01) |
| *H02K 29/12* | (2006.01) |
| *H02K 11/20* | (2016.01) |
| *H02K 11/215* | (2016.01) |
| *H02K 11/22* | (2016.01) |
| *H02K 11/225* | (2016.01) |
| *H02K 11/23* | (2016.01) |
| *H02K 11/24* | (2016.01) |

(52) U.S. Cl.
CPC ............... *H02K 5/04* (2013.01); *H02K 5/22* (2013.01); *H02K 11/20* (2016.01); *H02K 11/21* (2016.01); *H02K 11/215* (2016.01); *H02K 11/22* (2016.01); *H02K 11/225* (2016.01); *H02K 11/23* (2016.01); *H02K 11/24* (2016.01); *H02K 29/08* (2013.01); *H02K 29/10* (2013.01); *H02K 29/12* (2013.01)

(58) Field of Classification Search
CPC .......... H02K 5/22; H02K 11/20–11/23; H02K 29/00–29/14
See application file for complete search history.

(56) References Cited

U.S. PATENT DOCUMENTS

2016/0181885 A1* 6/2016 Yamasaki ............... H02K 11/33
180/443

FOREIGN PATENT DOCUMENTS

| CN | 102130520 A | 7/2011 |
|---|---|---|
| CN | 102484398 A | 5/2012 |
| CN | 203707896 U | 7/2014 |

OTHER PUBLICATIONS

Chinese Office Action and Search Report for Chinese Application No. 2017109296353 dated Mar. 26, 2019, 7 pages (Office Action Only in English).

* cited by examiner

*Primary Examiner* — Ramon M Barrera

(57) ABSTRACT

A brushless motor assembly includes a housing, a cover assembly, an insert, and a sensor assembly. The housing is disposed about a motor. The cover assembly is disposed on the housing and has a base and a connecting portion. The connecting portion defines a connecting region. The insert has a first insert surface and a second insert surface disposed opposite the first insert surface, each extending between a first insert end and a second insert end. The sensor assembly is disposed on the second insert surface.

17 Claims, 4 Drawing Sheets

BRUSHLESS MOTOR ASSEMBLY

BACKGROUND OF THE INVENTION

Electric motor assemblies are used in a variety of applications such as automotive vehicles, power tools, marine vehicles, or the like. The position of a motor or motor shaft is provided to a controller to ensure efficient or effective electric motor assembly operation. The position of the motor or motor shaft is provided by a sensor that may be permanently installed into the electric motor assembly.

SUMMARY OF THE INVENTION

According to an embodiment of the present disclosure, a brushless motor assembly is provided. The brushless motor assembly includes a housing, a cover assembly, an insert, and a sensor assembly. The housing is disposed about a motor. The cover assembly has a base and a connecting portion. The base is operatively connected to the housing. The connecting portion extends from the base. The connecting portion defines a connecting region. The insert has a first insert surface and a second insert surface disposed opposite the first insert surface, each extending between a first insert end and a second insert end. The sensor assembly is disposed on the second insert surface.

According to another embodiment of the present disclosure, a brushless motor assembly is provided. The brushless motor assembly includes a cover assembly and an insert. The cover assembly has a connecting portion that is configured as a wall having an outer surface and an inner surface extending from a base that is disposed on a housing towards a connecting region. The insert has a first insert surface and a second insert surface each extending between a first insert end and a second insert end, a first connecting arm extending from the first insert surface towards the inner surface, and a second connecting arm spaced apart from the first connecting arm and extending from the first insert surface towards the inner surface.

According to yet another embodiment of the present disclosure, a brushless motor assembly is provided. The brushless motor assembly includes a housing, a cover assembly, and an insert. The housing has an inner wall and an outer wall disposed about the inner wall, the inner wall being disposed about a shaft of a motor. The cover assembly has a base disposed on the housing and a connecting portion having an outer surface and an inner surface extending away from the base, the inner surface defining a passageway. The insert is at least partially received within the passageway. The insert has a first insert surface and a second insert surface extending between a first insert end and a second insert end, a first connecting arm extending from the first insert surface towards the second insert end, and a second connecting arm extending from the first insert surface towards the second insert end.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
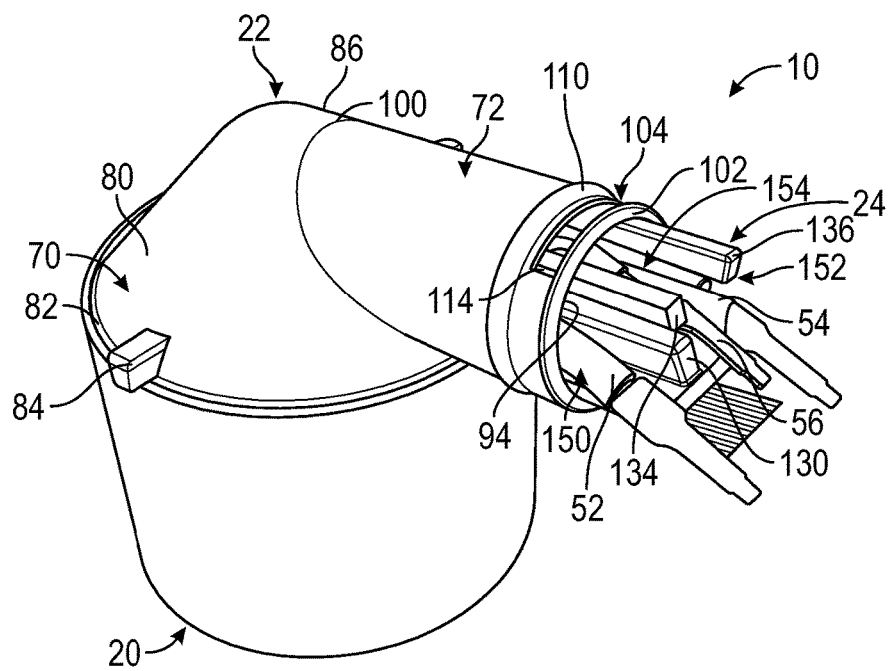
FIG. 1 is a perspective view of a brushless motor assembly.
Figure 2:
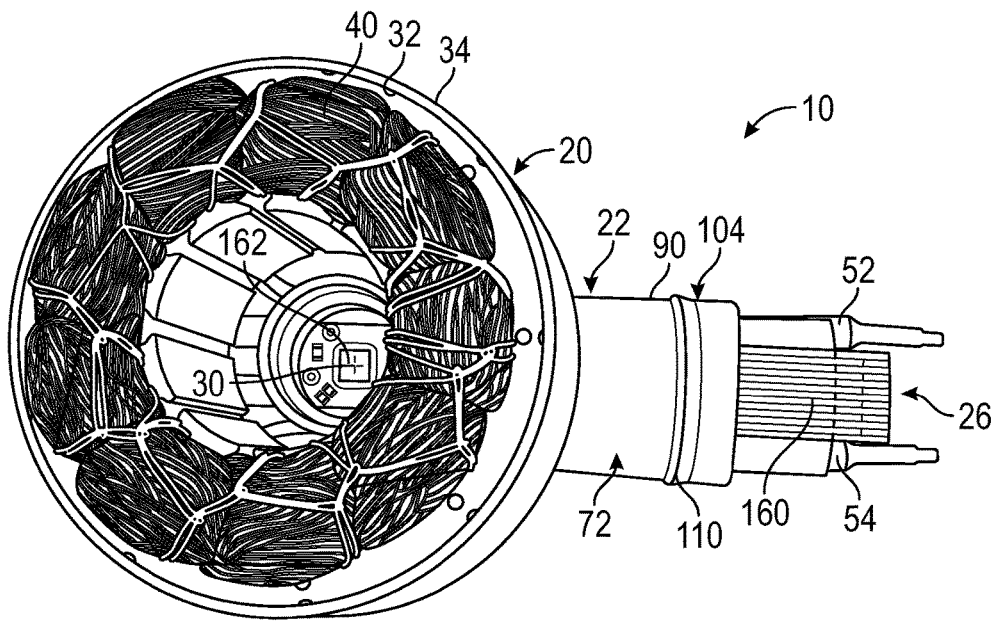
FIG. 2 is a bottom perspective view of the brushless motor assembly.
Figure 3:
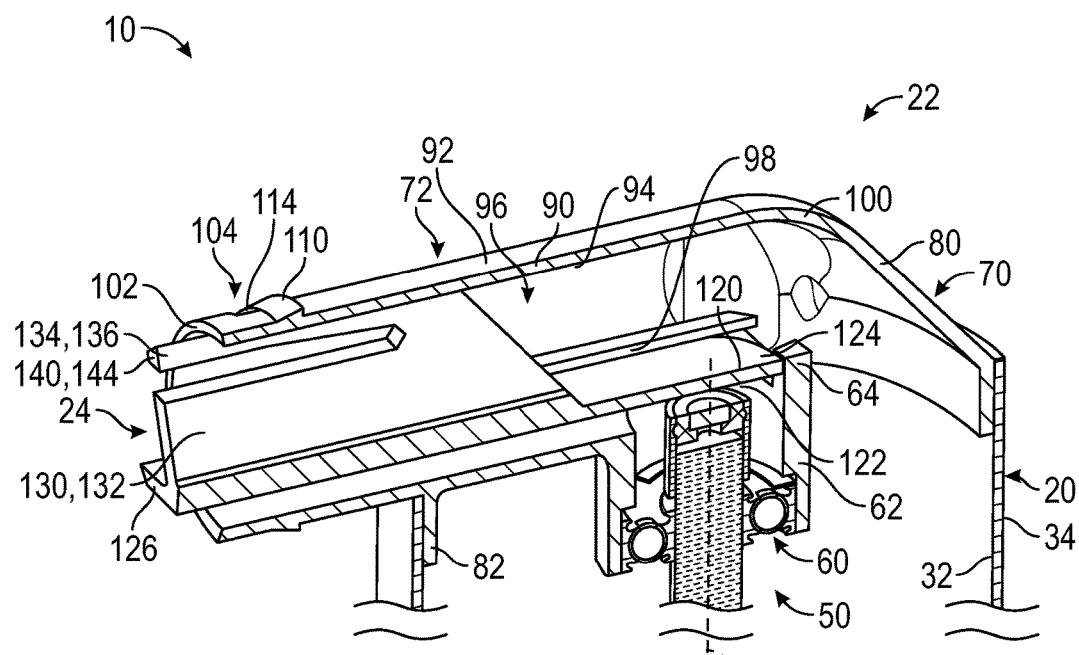
FIG. 3 is a partial cross section view of the brushless motor assembly.

Referring now to the Figures, where the invention will be described with reference to specific embodiments, without limiting same, it is to be understood that the disclosed embodiments are merely illustrative and may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Referring to FIGS. 1-3, 5, and 6, a brushless motor assembly 10 is shown. The brushless motor assembly 10 may be provided as part of an electromechanical actuator. The brushless motor assembly 10 may be provided as part of a mechanism that produces the electromechanical actuator's output force. For example, the brushless motor assembly 10 may be provided as part of an electric brake actuator that helps create a power assist to push a brake piston in the master cylinder of a brake assembly to aid in the application of a braking force to a vehicle wheel.

The brushless motor assembly 10 includes a housing 20, a cover assembly 22, an insert 24, and a sensor assembly 26. The housing 20 is disposed about an axis 30. The housing 20 includes an inner wall 32 disposed opposite an outer wall 34. The inner wall 32 of the housing 20 is disposed about a motor 40.

The motor 40 is disposed about the axis 30 and has a centerline that is disposed coaxially with the axis 30. The motor 40 includes a motor shaft 50, a first electrical lead 52, a second electrical lead 54, a third electrical lead 56, and a stator.

The motor shaft 50 includes a rotor coupled to the motor shaft 50. A position of the motor shaft 50 may be indicative of A position of the motor shaft 50 may be indicative of an angular or rotational position of the rotor relative to the stator. The motor shaft 50 is proximately aligned with the axis 30 and rotates about the axis 30. The motor shaft 50 is rotatably and axially supported by a bearing 60 that is received within a cylindrical member 62. The cylindrical member 62 includes a stop feature 64. The stop feature 64 extends from the cylindrical member 62 and is disposed substantially parallel to the axis 30. In at least one embodiment, the stop feature 64 is defined by the inner wall 32 of the housing 20.

The first electrical lead 52, the second electrical lead 54, and the third electrical lead 56 extend from the motor 40 and includes an end that is at least partially disposed outside of the housing 20 of the brushless motor assembly 10. At least one of the first electrical lead 52, the second electrical lead 54, and the third electrical lead 56 is configured as a power lead that is configured to provide electrical power to the mechanism that produces or provides the electromechanical actuator's output force.

The cover assembly 22 is operatively connected to the housing 20 to cover the motor 40. The cover assembly 22 includes a base 70 and a connecting portion 72. The base 70 has a base body 80 defining a circumferentially extending rim 82 and an arm 84. The base body 80 may have a generally conical shape having a vertex or an apex 86. The apex 86 extends above the housing 20.

The circumferentially extending rim 82 is configured to engage the inner wall 32 of the housing 20. In at least one embodiment, the circumferentially extending rim 82 is disposed proximate the inner wall 32 of the housing 20.

The arm 84 extends radially from the base body 80 and is disposed substantially perpendicular to the axis 30. The arm 84 may extend beyond the outer wall 34 of the housing 20. The arm 84 engages a top end of the housing 20 to position the cover assembly 22 relative to the housing 20.

The connecting portion 72 extends radially from the base 70 along an axis that is disposed substantially perpendicular and planar to the axis 30. The connecting portion 72 is radially and axially spaced apart from the arm 84. The connecting portion 72 is configured as a wall 90 having an outer surface 92 and an inner surface 94. The inner surface 94 defines a passageway 96 and a guide rail 98 that is disposed within the passageway 96.

The wall 90 is operatively connected to the base 70 at a proximal end 100 and is spaced apart from the housing 20 at a distal end 102. The passageway 96 extends between the proximal end 100 and the distal end 102 of the wall 90 of the connecting portion 72. The guide rail 98 extends between the proximal end 100 and the distal end 102 of the wall 90 of the connecting portion 72. The guide rail 98 is disposed substantially parallel to the axis along which the wall 90 extends and is disposed substantially perpendicular to the axis 30.

The wall 90 of the connecting portion 72 defines a connecting region 104 proximate the distal end 102. The connecting region 104 includes a rib 110 and an opening 114.

The rib 110 is disposed at the distal end 102 of the wall 90 of the connecting portion 72. The rib 110 is defined near an end of the outer surface 92 of the wall 90 and extends away from the inner surface 94 of the wall 90.

The opening 114 is disposed proximate the distal end 102 of the wall 90 of the connecting portion 72 and is disposed between the rib 110 and the distal end 102. The opening 114 extends from the outer surface 92 to the inner surface 94.

Referring to FIGS. 1-3, 5, and 6, the insert 24 is at least partially received within the passageway 96 of the wall 90 of the connecting portion 72. The insert 24 engages the inner surface 94. The insert 24 includes a first insert surface 120 and a second insert surface 122 disposed opposite the first insert surface 120. The first insert surface 120 and the second insert surface 122 extend between a first insert end 124 and a second insert end 126. The first insert end 124 is configured to engage the stop feature 64 to position the insert 24 at a predetermined location within the passageway 96 of the wall 90 of the connecting portion 72 of the cover assembly 22. The first insert surface 120 or the second insert surface 122 engages the guide rail 98. At least a portion of the second insert end 126 is not received within the passageway 96 of the connecting portion 72.

Figure 4:
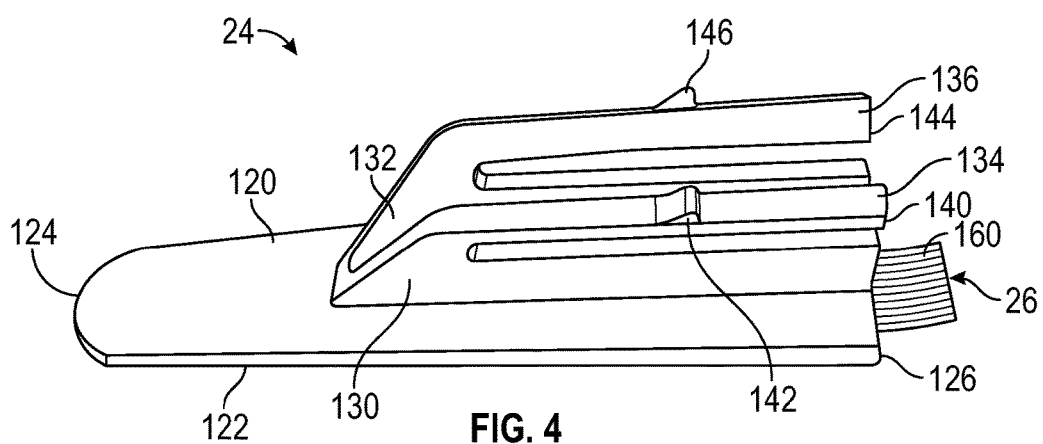
FIG. 4 is a perspective view of an insert of the brushless motor assembly.
Figure 5:
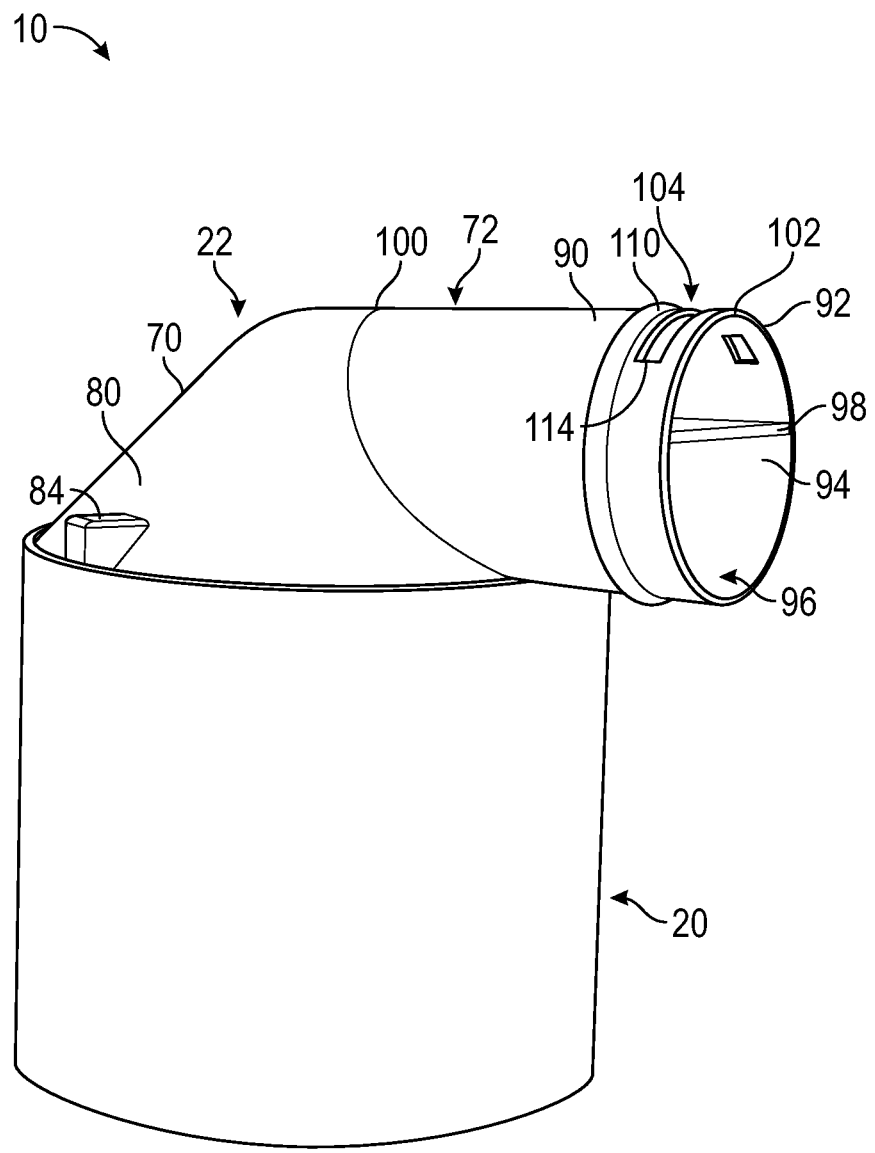
FIG. 5 is a perspective view of a housing and a cover assembly of the brushless motor assembly.

Referring to FIG. 4, insert 24 includes a first wall 130, a second wall 132, a first connecting arm 134, and a second connecting arm 136. The first wall 130 extends from the second insert surface 122 and extends towards the second insert end 126. At least a portion of the first wall 130 extends radially towards the first connecting arm 134. The second wall 132 extends from the first insert surface 120 and extends towards the second insert end 126. At least a portion of the second wall 132 extends radially towards the second connecting arm 136. The first wall 130 is joined to the second wall 132 having a general "V-shaped" configuration. The first wall 130 and the second wall 132 become progressively further apart from each other in a direction that extends away from the first insert surface 120.

The first connecting arm 134 extends from at least one of the first insert surface 120 and the first wall 130. The first connecting arm 134 extends axially towards the second insert end 126. A first connecting arm distal end 140 is spaced apart from the second insert surface 122 and is spaced apart from the first wall 130. The first connecting arm 134 defines a first tab 142. The first tab 142 is spaced apart from the first connecting arm distal end 140. The first tab 142 is configured to engage the inner surface 94 of the wall 90 of the connecting portion 72. The first tab 142 is configured to be at least partially received within the opening 114 to at least partially secure the insert 24 with the connecting region 104 of the connecting portion 72 of the cover assembly 22.

The second connecting arm 136 is spaced apart from the first connecting arm 134. The second connecting arm 136 extends from at least one of the first insert surface 120 and the second wall 132. The second connecting arm 136 extends axially towards the second insert end 126. A second connecting arm distal end 144 is spaced apart from the first insert surface 120 and is spaced apart from the second wall 132. The second connecting arm 136 defines a second tab 146. The second tab 146 is configured to engage the inner surface 94 of the wall 90 of the connecting portion 72. The second tab 146 is configured to be at least partially received within the opening 114 to at least partially secure the insert 24 with the connecting region 104 of the connecting portion 72 of the cover assembly 22. In at least one embodiment, the second tab 146 is configured to be at least partially received within another opening that is spaced apart from the opening 114. The insert 24 may be slidingly inserted into the passageway 96 and guided by the guide rail 98 of the wall 90 of the connecting portion 72. The first insert end 124 may engage the stop feature 64 and may be snap fit into place via the first tab 142 or the second tab 146 and received within the opening 114 or the another opening.

Figure 6:
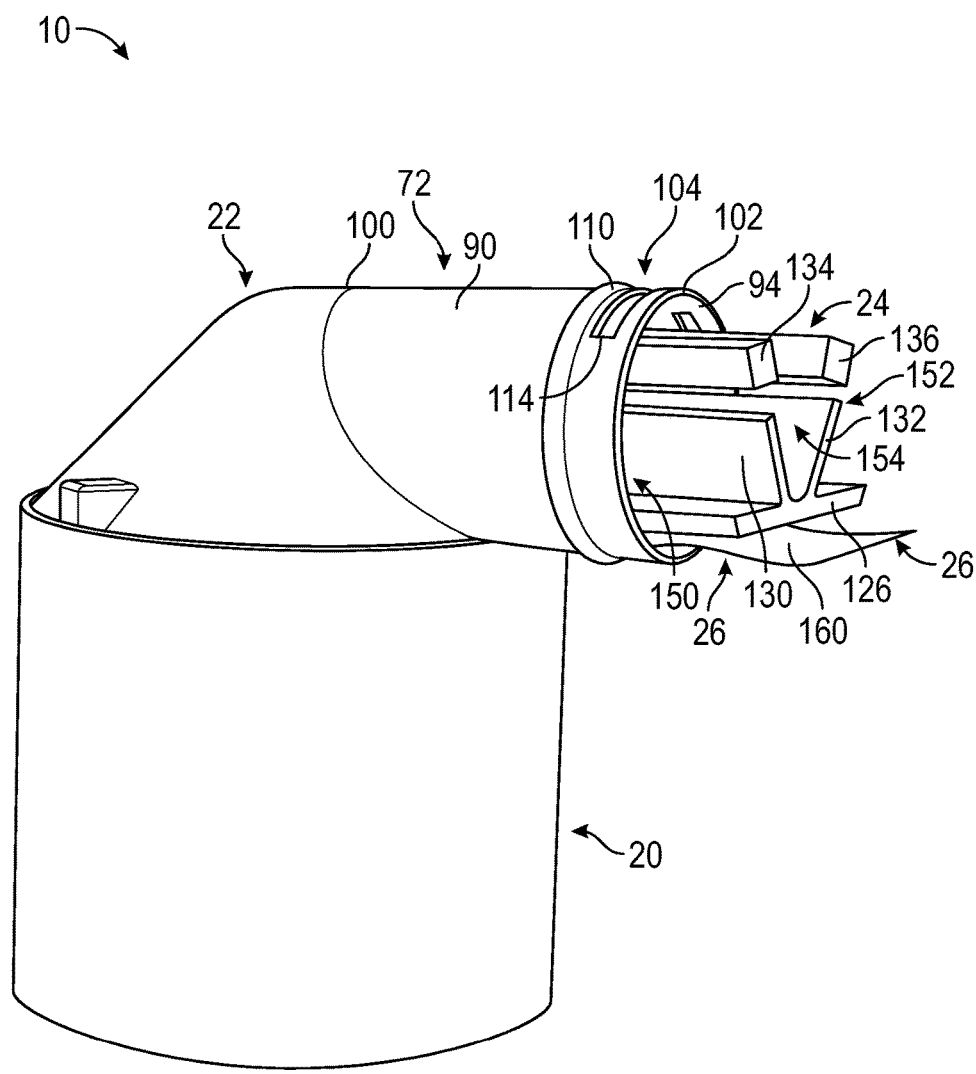
FIG. 6 is a perspective view of the brushless motor assembly without the motor leads.

Referring to FIGS. 1 and 6, the first connecting arm 134, the first wall 130, the first insert surface 120, and the inner surface 94 of the wall 90 define a first lead receiving region 150. The first electrical lead 52 is at least partially received within or at least partially extends through the first lead receiving region 150. The second connecting arm 136, the second wall 132, the first insert surface 120, and the inner surface 94 of the wall 90 define a second lead receiving region 152. The second electrical lead 54 is at least partially received within or at least partially extends through the second lead receiving region 152. The first wall 130, the first connecting arm 134, the second wall 132, and the second connecting arm 136 defined a third lead receiving region 154. The third electrical lead 56 is at least partially received within or at least partially extends through the third lead receiving region 154.

Referring to FIGS. 1, 2, 4, and 6, the sensor assembly 26 is disposed on the second insert surface 122. The combination of the insert 24 and the sensor assembly 26 disposed on the insert forms a motor sense board assembly. The sensor assembly 26 is in communication with a controller or control module. The sensor assembly 26 includes a flexible circuit or a flex board 160 having a sensor 162 disposed proximate the first insert end 124. The flex board 160 includes a plurality of flexible electrical conductors or electro conductive leads embedded between sheets of a flexible material, such as an insulating material, that are in operable communication with the sensor 162.

The sensor 162 is proximately aligned with the centerline of the motor 40 that is proximately aligned with the axis 30. The sensor 162 is configured to provide a signal indicative of a rotational or angular position of the motor shaft 50 and/or the rotor operatively connected to the motor shaft 50. The sensor 162 may be configured as an angular or rotational position sensor, a torque sensor, or the like. The sensor 162 may be a Hall Effect sensor, a magnetic rotary encoder, a rotary position sensor, a magnetic angle encoder, a clinometer, a magneto resistive sensor, an optical sensor, a resistive sensor, or the like.

The first electrical lead 52, the second electrical lead 54, the third electrical lead 56, and the flex board 160 may run through a hose or tube and be directly connected to the controller. In at least one embodiment, a cover or a grommet is disposed over an end of the connecting portion 72 of the cover assembly 22 to cover the wires, electrical leads, or portion of the flex board that run outside of the housing 20 and/or the cover assembly 22.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the scope of the invention. Additionally, while various embodiments of the invention have been described, it is to be understood that aspects of the invention may include only some of the described embodiments or various combinations of the described embodiments. Accordingly, the invention is not to be seen as limited by the foregoing description.

Having thus described the invention, it is claimed:

1. A brushless motor assembly, comprising:
a housing disposed about a motor;
a cover assembly having:
a base operatively connected to the housing;
a connecting portion extending from the base, the connecting portion defining a connecting region;
an insert having a first insert surface and a second insert surface disposed opposite the first insert surface, each extending between a first insert end and a second insert end;
a sensor assembly disposed on the second insert surface;
a first connecting arm of the insert, the first connecting arm extending from the first insert surface; and
a tab defined by the first connecting arm, the tab configured to engage an inner surface of the connecting portion.

2. The brushless motor assembly of claim 1, wherein the connecting portion defines a passageway within which the insert is at least partially received.

3. The brushless motor assembly of claim 1, wherein the sensor assembly includes a position sensor that is disposed proximate the first insert end.

4. The brushless motor assembly of claim 3, wherein the position sensor is aligned with a center of the motor.

5. A brushless motor assembly, comprising:
a cover assembly having a connecting portion configured as a wall having an outer surface and an inner surface extending from a base that is disposed on a housing towards a connecting region;
an insert having a first insert surface and a second insert surface each extending between a first insert end and a second insert end, a first connecting arm extending from the first insert surface towards the inner surface; and
a second connecting arm spaced apart from the first connecting arm and extending from the first insert surface towards the inner surface, the first connecting arm and the second connecting arm extending axially towards the second insert end.

6. The brushless motor assembly of claim 5, further comprising a sensor assembly disposed on the second insert surface.

7. The brushless motor assembly of claim 5, wherein a first connecting arm distal end and a second connecting arm distal end are spaced apart from the second insert surface.

8. The brushless motor assembly of claim 5, wherein the first connecting arm, the first insert surface, and the inner surface define a first motor lead receiving region.

9. The brushless motor assembly of claim 8, wherein the second connecting arm, the first insert surface, and the inner surface define a second motor lead receiving region.

10. The brushless motor assembly of claim 9, wherein the insert has a first wall extending from the first insert surface towards the first connecting arm and extending axially towards the second insert end.

11. The brushless motor assembly of claim 10, wherein the insert has a second wall that is spaced apart from the first wall and extending from the first insert surface towards the second connecting arm and extending axially towards the second insert end.

12. The brushless motor assembly of claim 11, wherein the first wall, the second wall, and the inner surface define a third motor lead receiving region.

13. A brushless motor assembly, comprising:
a housing having an inner wall and an outer wall disposed about the inner wall, the inner wall being disposed about a shaft of a motor;
a cover assembly having a base disposed on the housing and a connecting portion having an outer surface and an inner surface extending away from the base, the inner surface defining a passageway; and
an insert at least partially received within the passageway, the insert having a first insert surface and a second insert surface extending between a first insert end and a second insert end, a first connecting arm extending from the first insert surface towards the second insert end, and a second connecting arm extending from the first insert surface towards the second insert end.

14. The brushless motor assembly of claim 13, further comprising a sensor assembly disposed on the second insert surface, the sensor assembly having a position sensor disposed proximate the first insert end.

15. The brushless motor assembly of claim 14, wherein the inner wall defines a stop feature configured to engage the first insert end.

16. The brushless motor assembly of claim 15, wherein the sensor assembly is aligned with a center of the motor.

17. The brushless motor assembly of claim 15, wherein the inner surface defines a guide rail that is configured to engage at least one of the first insert surface and the second insert surface.

* * * * *